(No Model.)
J. ALEXANDER.
FRUIT GATHERER.
No. 386,680. Patented July 24, 1888.
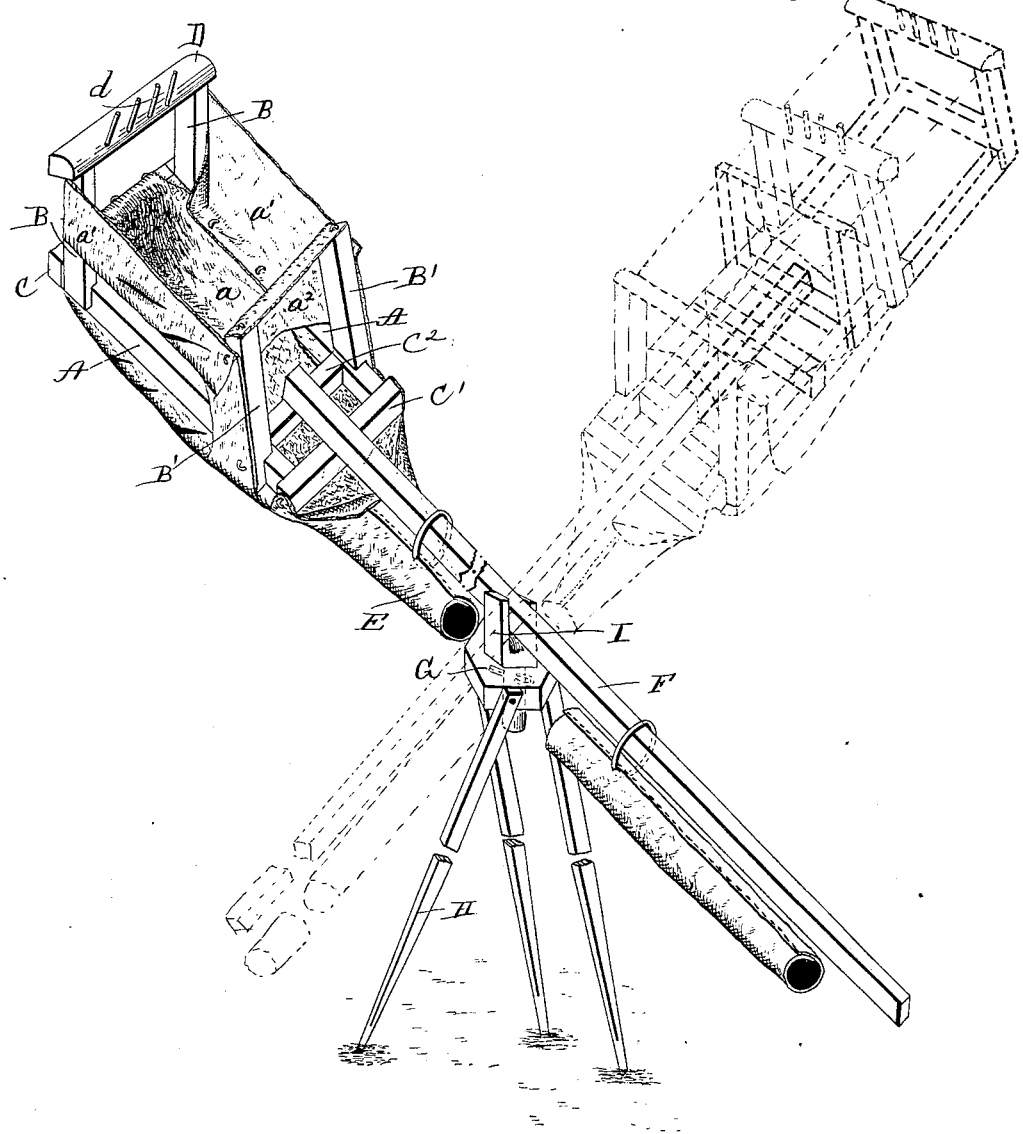
Witnesses;
R. C. Laurie
C. S. Cotton
Inventor:
James Alexander.
By R. S. & A. P. Lacey
attys

UNITED STATES PATENT OFFICE.

JAMES ALEXANDER, OF CHERRY FORK, OHIO.

FRUIT-GATHERER.

SPECIFICATION forming part of Letters Patent No. 386,680, dated July 24, 1888.

Application filed August 13, 1887. Serial No. 246,872. (No model.)

*To all whom it may concern:*

Be it known that I, JAMES ALEXANDER, a citizen of the United States, residing at Cherry Fork, in the county of Adams and State of Ohio, have invented certain new and useful Improvements in Fruit-Gatherers; and I do declare the following to be a full, clear, and exact description of the invention, such as will enable others skilled in the art to which it appertains to make and use the same, reference being had to the accompanying drawing, and to the letters and figures of reference marked thereon, which forms a part of this specification.

My invention relates to fruit-gatherers, and has for its object to improve this class of devices and produce a device which will be compact in arrangement, efficient in its application, and convenient of operation.

The improvement consists in the novel features of construction and combination of parts, hereinafter more fully set forth and claimed, and shown in the annexed drawing, which is a perspective view, parts being broken away, of a fruit-gatherer of my construction embodying my invention.

The frame is composed of side bars, A, end bars, C C', and the cross-bar C², and has standards B and B' at its four corners, the standards B being located at the upper end of the frame and the standards B' at its lower end, and each standard being in the vertical plane of the side bars, A, and projecting therefrom in the same direction, the standards B' B' being inclined, the direction of inclination being forward or away from the rear cross-bar, C', or the lower end of the frame. The picker-teeth $d$ are secured to the cross-bar D, which unites the ends of the standards B.

The chute E is of ordinary construction, and its mouth is held by being secured to the end C and the standards B and B', as shown. The chute is shaped at its upper end to form the bottom $a$, and is provided with the sides $a'$ and with the end $a^2$. The bottom $a$ covers the frame, the sides $a'$ extend from the upper standards, B, to the lower standards, B', and the end $a^2$ is stretched between the standards B'. The fruit when picked falls on the bottom $a$ and is directed thence down the chute, being prevented from falling to the ground by the sides $a'$ and the end $a^2$. The frame is provided with the handle or pole F, by which it is lifted to the desired position in the tree. To facilitate handling the picker, I have devised the support or tripod composed of the apertured plate G, the folding legs H, and the pivoted block or swivel-post I, swiveled in the aperture of said plate G, and having its upper end bifurcated to receive and hold the pole or handle F against lateral displacement. The pole can be slid up and down in the swiveled block or post and turned with the swivel-post laterally as may be required.

In practice the picker is turned about in the position shown in Fig. 1, with the mouth of the chute opening upward and the teeth uppermost. The picker in this position, and resting on the swivel block or post, is swung laterally or slid therein until the mouth of the chute comes below the fruit. The branch having the fruit comes between two of the teeth and a pull downward detaches the fruit from the stem or branch. The fruit strikes the mouth of the chute stretched beneath it, and is directed to the operator through the chute.

Having thus described my invention, what I claim, and desire to secure by Letters Patent, is—

The herein shown and described fruit gatherer, composed of the frame consisting of the side bars, A, the upper and the lower end bars, C and C', the cross-bar C², the pole or handle secured to the bars C' and C², the standards B B and B' B', projecting from the frame, the cross-bar D, uniting the upper ends of the standards B, and provided with teeth $d$, the chute having the lower side of its upper end extended over the said frame, the sides extended from the upper to the lower standards and secured thereto, and the end portion, $a^2$, stretched between and secured to the standards B' B', substantially as specified.

In testimony whereof I affix my signature in presence of two witnesses.

JAMES ALEXANDER.

Witnesses:
 J. R. CRISSMAN,
 J. S. GLASGOW.